March 18, 1952     H. F. MARSHALL     2,589,948
LOG OR PIPE TRANSPORTER
Filed Dec. 16, 1948     3 Sheets-Sheet 1
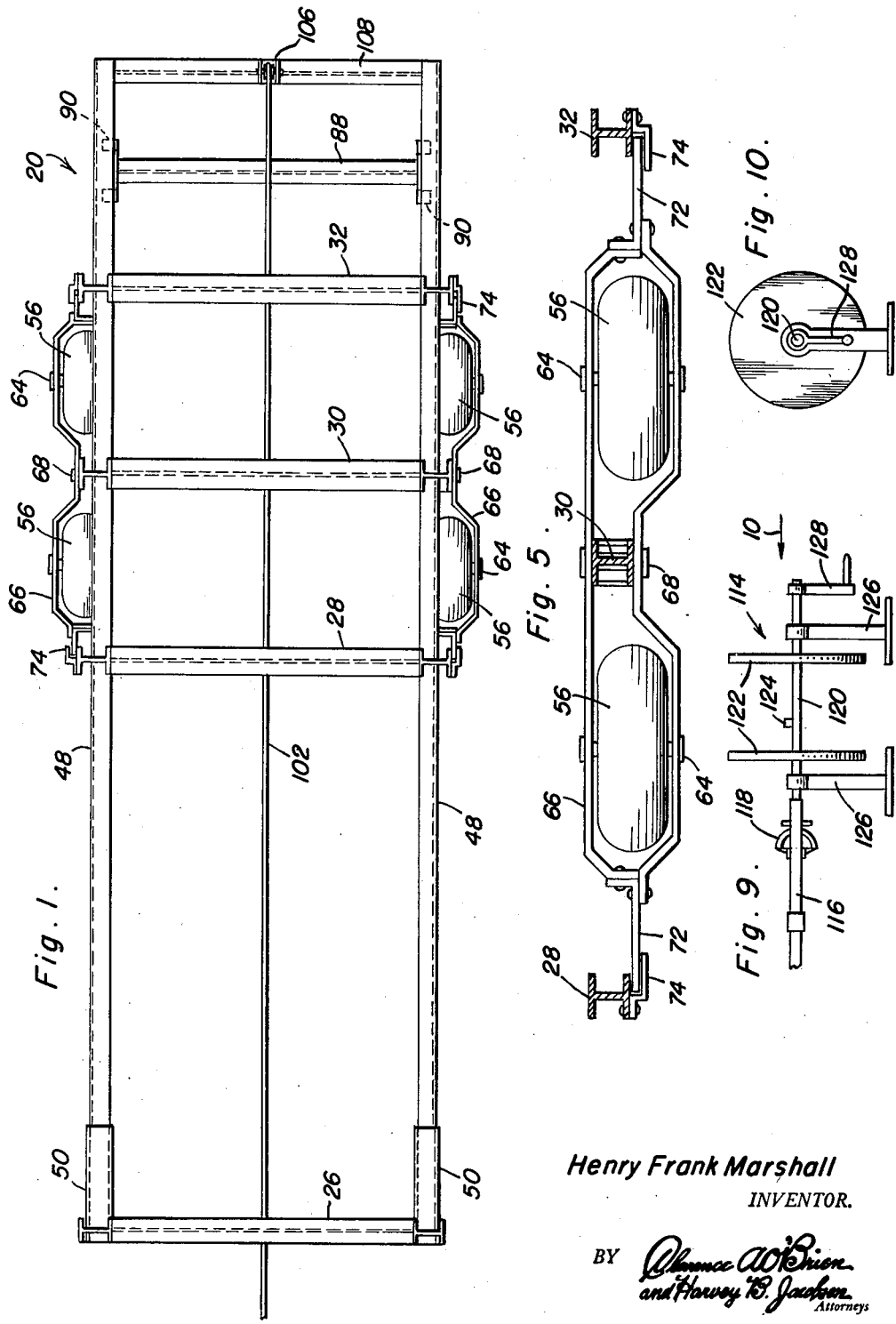
Henry Frank Marshall
INVENTOR.

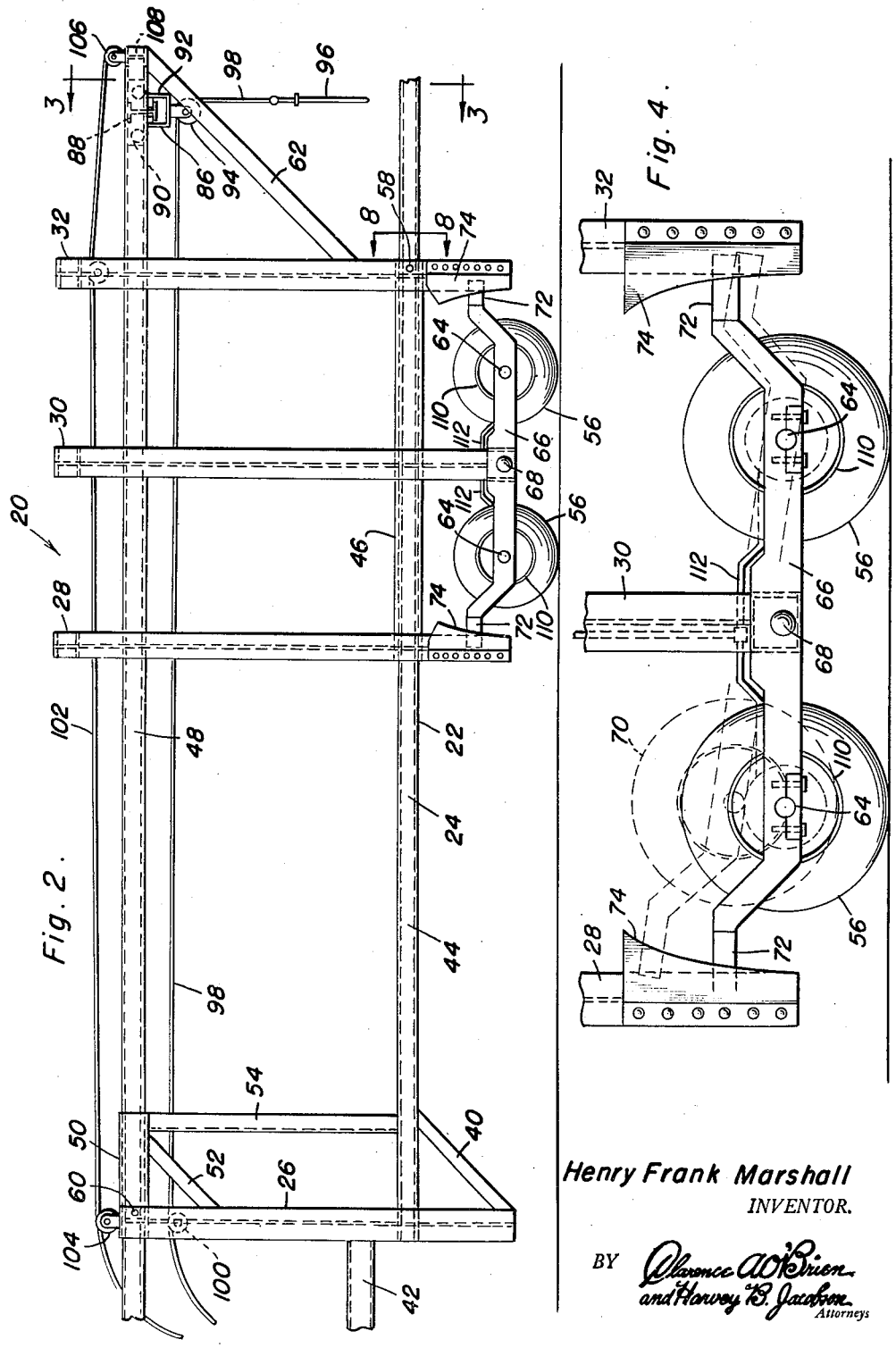

March 18, 1952  H. F. MARSHALL  2,589,948
LOG OR PIPE TRANSPORTER
Filed Dec. 16, 1948  3 Sheets-Sheet 3
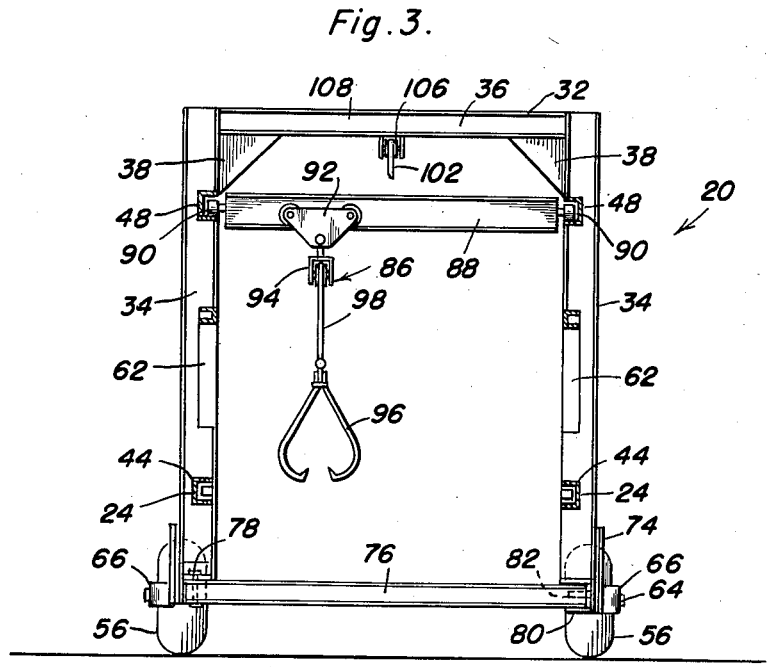
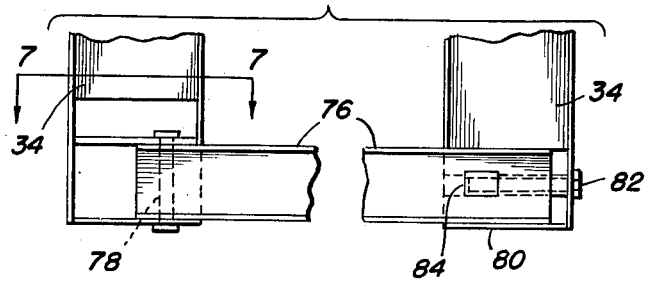
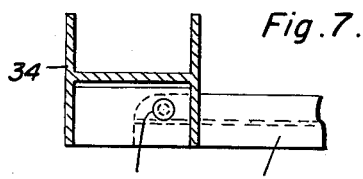
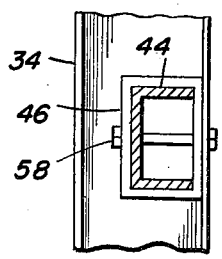
Inventor
Henry Frank Marshall
By *Clarence A. O'Brien and Harvey B. Jacobson*
Attorneys Patented Mar. 18, 1952

2,589,948

UNITED STATES PATENT OFFICE 2,589,948

LOG OR PIPE TRANSPORTER

Henry Frank Marshall, Walla Walla, Wash.

Application December 16, 1948, Serial No. 65,616

1 Claim. (Cl. 214—65)

This invention relates to new and useful improvements and structural refinements in transporters, and the principal object of the invention is to facilitate convenient and expeditious loading, hauling and unloading of logs, timber, pipes and similar articles requiring an unusually long carrier.

This object is achieved by the provision of the instant transporter which includes in its construction a wheeled frame or chassis provided with arched cross members and swingable load supports, the cross members carrying what may be called a hoist whereby the load may be conveniently lifted onto the supports for purposes of transportation, and whereby the load may be expeditiously lowered to the ground by simply swinging the supports out of the way.

An important feature of the invention, therefore, resides in the particular structural arrangement of the chassis and hoist as a whole, which arrangement facilitates the loading, carrying and unloading operations to be effected as above outlined.

Another feature of the invention resides in the provision of means for adjusting the frame or chassis of the transporter so as to efficiently accommodate logs or pipes of different lengths.

An additional feature of the invention concerns itself with the wheel suspension of the chassis which permits the transporter to travel smoothly and safely over uneven ground.

Some of the advantages of the invention lie in its simplicity of construction, in its convenience of maneuverability, and in its adaptability for use in association with any conventional tractor, truck or a similar power unit.

A further advantage of the invention resides in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a top plan view of the invention.

Figure 2 is a side elevational view thereof, showing the frame of the transporter partly foreshortened.

Figure 3 is a cross sectional view, taken substantially in the plane of the line 3—3 in Figure 2.

Figure 4 is a fragmentary side elevational view of the wheel suspension used in the invention.

Figure 5 is a cross sectional view, taken substantially in the plane of the line 5—5 in Figure 4.

Figure 6 is a fragmentary elevational detail showing the arrangement of one of the load supports used in the invention.

Figure 7 is a cross sectional view, taken substantially in the plane of the line 7—7 in Figure 6.

Figure 8 is a cross sectional view, taken substantially in the plane of the line 8—8 in Figure 2.

Figure 9 is an elevational view of an air hose reel such as may be used in association with the invention, and Figure 10 is an elevational view, taken in the direction of the arrow 10 in Figure 9.

Like characters of reference are employed to designate like parts in the specification and throughout the several views.

Referring now to the accompanying drawings in detail, the invention consists of a log or pipe transporter designated generally by the reference character 20, the same embodying in its construction an elongated frame or chassis 22 including a pair of spaced parallel side members 24 and a plurality of arched cross members 26, 28, 30 and 32, whereby the side members 24 are rigidly secured together. The cross members 26, 28, 30 and 32 are more-or-less similar in construction, each including a pair of spaced uprights 34 having lower end portions thereof secured to the side members 24 (see Figure 3) the upper ends of the uprights 34 being secured together by a transverse member 36 and reinforced as at 38. The components 34, 36 of the cross members 26, 28, etc. are preferably I-shaped in configuration, and it is to be noted that the uprights 34 project somewhat below the side members 24, as is best shown in Figure 2.

The lower ends of the uprights of the cross members 26 are reinforced to the side members 24 as at 40 (see Figure 2), and the cross member 26, being disposed at the forward end of the transporter, is provided with a forwardly projecting draw bar 42 of any suitable type, whereby the entire device may be coupled to its source of power, such as for example, a tractor, a truck, or the like. If desired, the draw bar 42 may be adjustable vertically on the cross member 26 so as to conform to the "height" of the hitch to which it is to be connected.

Each of the aforementioned side members 24 includes a U-shaped channel 44 which is rigidly secured at one end to the cross member 26 while an intermediate portion thereof is slidable in a box-shaped channel 46 secured to the cross members 28, 30, 32 and also constituting a component of the side member 24. Moreover, a pair of spaced parallel rails 48 are rigidly secured in an elevated position to the cross members 28, 30, 32 and are slidable in box-shaped channels 50 which are rigidly secured to the cross member 26. It may be explained at this point that the channels 50 are reinforced to the cross member 26 as at 52 and to the channels 44 of the side members 24 as at 54, as is best shown in Figure 2.

In any event, by virtue of the arrangement above described, the distance from the draw bar 42 to the traveling wheels 56 (hereinafter described) may be increased or decreased in accordance with the length of the load which is to be carried, this being effected by simply sliding the channels 44 in the channels 46 and the channels 48 in the channels 50, and employing suitable pins 58 and 60 for releasably locking the channels in a predetermined position, as will be clearly apparent.

The rear ends of the channels or rails 48 are reinforced to the cross member 32 as at 62, and it is to be noted at this point that the arrangement of the telescoped channels 44, 46 and 48, 50 is such that when the frame is foreshortened, the channels 44 will project rearwardly while the channels 48 project forwardly, and sufficient clearance will be provided under the channels 48 and in front of the channels 44 to accommodate the prime mover by which the transporter is operated.

The aforementioned wheels 56 are arranged in sets of two at both sides of the frame, the wheels in each set being mounted on suitable axles 64 journaled in a wheel yoke 66 configurated substantially as shown.

Suitable pivot pins 68 project laterally from the lower end portions of the cross member 30 and are used for attaching the wheel yokes 66 to the frame 22 as a whole, whereby the wheels are enabled to travel smoothly and safely over uneven terrain by being permitted to rise and fall individually, as exemplified by the phantom lines 70 in Figure 4. However, in order to prevent lateral distortion of the wheel yokes 66, the latter are equipped at the ends thereof with stabilizing brackets 72 (see Figure 5) which are slidable in suitable guides 74 secured to the lower end portions of the cross members 28 and 32.

A plurality of load supports 76 are provided on the frame 22, such as for example, at the lower ends of the cross members 26, 28, 30 or 32, each of these supports being hinged at one end thereof as at 78 to one upright of the cross member (see Figures 6 and 7) while the remaining end portion of the load support is supportably engageable by a bottom plate 80 provided at the lower end of the remaining upright of the cross member, as will be clearly apparent. The load supports 76 normally extend transversely of the frame between and under the level of the side members 24, in which position they are releasably retained by suitable anchor bolts 82 engaging slots 84 with which the supports 76 are formed (see Figure 7). However, upon loosening of the anchor bolts 82, the load supports may be swung out of the way to a position adjacent one of the side members 24, whereby the load supports clear the space between the side members and facilitate raising of the load from the ground upwardly toward the transverse portions 36 of the cross members 26, 28, etc.

The raising of the load is effected by means of a power operated hoist 86 consisting of a transverse beam 88 equipped at the ends thereof with suitable rollers 90 whereby it may travel forwardly and rearwardly in the rails 48, the beam 88 carrying a suitable trolley 92 which, in turn, supports a tackle 94 from which a load grab 96 is suspended by means of a cable 98. This cable, after passing over a suitable guide pulley 100 supported by the cross member 26, is operatively connected to a winch, or the like, on the tractor by which the transporter is drawn, and it is to be noted that the entire hoist may be drawn toward the rear end of the frame by a further cable 102 which is anchored at one end thereof to the beam 88, while its remaining end portion is windable upon a further winch (not shown) with which the tractor may be provided. The cable 102 passes over a guide pulley 104 on the cross member 26, and over a further guide pulley 106 mounted upon a transverse beam 108 carried by the rear end of the rails 48, substantially as shown. By virtue of this arrangement, the cable 102 may be permitted to pay out freely while the cable 98 is hauled in, so that when the grab 96 contacts the tackle 94, the entire hoist 86 will be drawn forwardly toward the cross member 26. On the other hand, by simply allowing the cable 98 to pay out freely and hauling in the cable 102, the hoist 86 will be drawn toward the rear end of the frame, as desired.

When the invention is placed in use, the transporter is driven into a position over the logs or pipes which are to be moved, and the grab 96 is engaged with the load, for example, with the rear end of the load, and the rear end of the load is lifted to a position where the rear of the support beams 76 may be swung to a transverse position in the frame and the rear end portion of the load may subsequently be lowered so as to rest on this particular support. Thereupon, the hoist 86 is caused to travel forwardly on the rails 48 and the front end of the load is similarly lifted and deposited onto the front load support, whereupon the load may be conveniently transported to a location where the load is to be discharged. The unloading operation is effected by simply reversing the loading procedure above described, upraising first one end of the load and swinging the adjacent load support out of the way so that the upraised end of the load may be dropped to the ground, and thereafter repeating this procedure at the other end of the load, as will be clearly apparent.

If desired, the wheels 56 of the transporter may be equipped with air brakes 110 which may receive their supply of compressed air through the medium of suitable conduits 112 which, in turn, are connected to a compressed air tank on the prime mover (not shown). Suitable means such as are illustrated in the accompanying Figures 9 and 10 may be employed in the manner of a reel for a flexible air hose connecting the compressed air tank with the conduits 112 in such manner as to compensate for the variable distance of the wheels 56 from the draw bar 42, the reeling means being designated generally by the reference character 114 and involving the provision of a stationary air supply tube 116 connected by a rotatable seal joint 118 to the rotatable shaft 120 of a reel 122 on which a flexible connecting hose may be wound and to which it may be connected by means of a suitable nipple 124. The reel shaft 120 may be rotatably journaled in suitable brackets 126 and actuated by a convenient crank handle 128, as will be clearly apparent.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a log or pipe carrier, the combination of an elongated frame comprising a pair of side members, an inverted U-shaped front cross member secured to the front ends of said side members, a draw bar attached to said front cross member, a pair of channels slidable on rear end portions of said side members, a set of inverted U-shaped rear cross members secured in tandem to said channels and slidable therewith on the side members, travelling wheels mounted at lower ends of the rear cross members, a pair of spaced parallel rails having intermediate portions thereof secured to upper portions of the rear cross members, a pair of guides secured to the upper portion of the front cross member and having forward portions of the respective rails slidable therein, and a travelling hoist mounted on said rails.

HENRY FRANK MARSHALL.

REFERENCES CITED

The following references are of record in the file of this patent:

UNITED STATES PATENTS

| Number | Name | Date |
|---|---|---|
| 1,614,769 | Amsler | Jan. 18, 1927 |
| 1,973,030 | Webber | Sept. 11, 1934 |
| 2,288,246 | Kuester | June 30, 1942 |
| 2,360,619 | Peterman | Oct. 17, 1944 |
| 2,365,884 | Kucera | Dec. 26, 1944 |
| 2,399,304 | Watkins | Apr. 30, 1946 |
| 2,428,144 | Clough | Sept. 30, 1947 |
| 2,452,938 | Krake | Nov. 2, 1948 |
| 2,528,672 | Sullivan | Nov. 7, 1950 |

FOREIGN PATENTS

| Number | Country | Date |
|---|---|---|
| 470,114 | Great Britain | Aug. 10, 1937 |